United States Patent
Zou et al.

(10) Patent No.: US 10,466,947 B2
(45) Date of Patent: Nov. 5, 2019

(54) METHOD AND DEVICE FOR BLACK AND WHITE SCREEN DISPLAY BASED ON ANDROID PLATFORM, AND SMART TERMINAL

(71) Applicant: GOERTEK INC., Weifang (CN)

(72) Inventors: Guomin Zou, Weifang (CN); Yifan Zhang, Weifang (CN); Pengcheng Su, Weifang (CN)

(73) Assignee: Goertek Inc., Weifang (CN)

( * ) Notice: Subject to any disclaimer, the term of this patent is extended or adjusted under 35 U.S.C. 154(b) by 260 days.

(21) Appl. No.: 15/531,633

(22) PCT Filed: Jul. 4, 2016

(86) PCT No.: PCT/CN2016/088363
§ 371 (c)(1),
(2) Date: May 30, 2017

(87) PCT Pub. No.: WO2017/084351
PCT Pub. Date: May 26, 2017

(65) Prior Publication Data
US 2018/0024798 A1 Jan. 25, 2018

(30) Foreign Application Priority Data
Nov. 16, 2015 (CN) .......................... 2015 1 0784840

(51) Int. Cl.
*G09G 5/02* (2006.01)
*G06F 3/14* (2006.01)
(Continued)

(52) U.S. Cl.
CPC ............. *G06F 3/14* (2013.01); *G09G 3/2092* (2013.01); *G09G 3/34* (2013.01); *G09G 5/028* (2013.01); *G09G 2340/08* (2013.01)

(58) Field of Classification Search
CPC .. G06F 2206/1512; G06F 3/14; G06F 3/1475; G06F 3/2092; G06F 5/028; G06F 5/04; G06F 2340/08; H01H 2219/0023
See application file for complete search history.

(56) References Cited

U.S. PATENT DOCUMENTS

| 6,684,257 B1 * | 1/2004 | Camut ................... H04L 29/06 709/217 |
| 9,245,485 B1 * | 1/2016 | Hu ........................ G09G 3/3611 |

(Continued)

FOREIGN PATENT DOCUMENTS

| CN | 101123078 A | 2/2008 |
| CN | 102624993 A | 8/2012 |

(Continued)

OTHER PUBLICATIONS

Chinese First Office Action dated Dec. 21, 2017 for Application No. 201510784840.6.

(Continued)

*Primary Examiner* — Antonio A Caschera
(74) *Attorney, Agent, or Firm* — Moser Taboada

(57) ABSTRACT

A method and a device for a black and white screen display based on an Android platform, and a smart terminal. The method comprises: selecting a size of the black and white screen according to an image display size that is generated in the Android platform, so that the image display size is adapted to the size of the black and white screen; acquiring Android display data that is generated in the Android platform; individually converting the Android display data that is corresponding to each of pixels into black and white display data that is corresponding to each of the pixels; buffering the converted black and white display data into a queue, extracting the data from the queue by using a preset real-time process and outputting to a data interface of the black and white screen according to a preset frame rate; and (Continued)

displaying the black and white display data that is corresponding to each of the pixels on the black and white screen.

15 Claims, 3 Drawing Sheets

(51) Int. Cl.
  *G09G 3/34* (2006.01)
  *G09G 3/20* (2006.01)

(56) References Cited

U.S. PATENT DOCUMENTS

| | | | |
|---|---|---|---|
| 9,761,198 B2* | 9/2017 | Huang | G09G 5/18 |
| 2004/0012608 A1* | 1/2004 | Jeon | G09G 5/006 |
| | | | 345/600 |
| 2011/0098083 A1 | 4/2011 | Lablans | |
| 2011/0276394 A1* | 11/2011 | Chan | G06Q 30/0251 |
| | | | 705/14.49 |
| 2014/0240333 A1* | 8/2014 | Shirota | G09G 5/39 |
| | | | 345/531 |
| 2015/0243236 A1* | 8/2015 | Jain | G09G 3/20 |
| | | | 345/690 |

FOREIGN PATENT DOCUMENTS

| | | |
|---|---|---|
| CN | 103049257 A | 4/2013 |
| CN | 104156191 A | 11/2014 |
| CN | 203941679 U | 11/2014 |
| CN | 105468320 A | 4/2016 |
| WO | WO-2014195673 A1 | 12/2014 |

OTHER PUBLICATIONS

International Search Report dated Oct. 11, 2016 for PCT Application No. PCT/CN2016/088363.

* cited by examiner

METHOD AND DEVICE FOR BLACK AND WHITE SCREEN DISPLAY BASED ON ANDROID PLATFORM, AND SMART TERMINAL

TECHNICAL FIELD

The present disclosure relates to the technical field of visual equipments, and specifically to a method and a device for a black and white screen display based on an Android platform, and a smart terminal.

BACKGROUND

Currently, the Android display data that are generated in the Android platform are color display data that are corresponding to multiple data bits of each of the pixels, and in order to transmit the color display data, the common interfaces of the displaying screens that are supported by default by the Android platform comprise: TTL (Transistor Transistor Logic) interface, LVDS (Low-Voltage Differential Signaling) interface, EDP (Embedded Display Port) interface and MIPI (Mobile Industry Processor Interface) and so on. The communication manners of those interfaces are very similar, and their data transmission rates all can reach hundreds of Mbit/s, which satisfies the refresh rate of 60 fps of the Android platform.

However, the data that are supported by the black and white screen are black and white display data that are corresponding to single data bit of each of the pixels, and in order to transmit the black and white display data, the black and white screen generally only employs the SPI (Serial Peripheral Interface). All of the conventional Android platforms do not support the black and white screens of that type of interfaces, and the color display data that are generated by the Android platforms cannot be displayed on black and white screens. Additionally, the data transmission rate of the SPI interface is only 2 Mbit/s, and the frame drop phenomenon arises when the Android platforms quickly generate images, which cannot satisfy the demands of black and white display of the Android platforms.

SUMMARY

In the light of the above problems, the present disclosure provides a method and device for a black and white screen display based on an Android platform, and a smart terminal, to solve the above problems or at least partially solve the above problems.

According to an aspect of the present disclosure, there is provided a method for a black and white screen display based on an Android platform, the method comprising:

selecting a size of the black and white screen according to an image display size that is generated in the Android platform, so that the image display size is adapted to the size of the black and white screen;

acquiring Android display data that are generated in the Android platform, and prohibiting the Android display data to be directly outputted to the black and white screen;

individually converting the Android display data that are corresponding to each of pixels into black and white display data that are corresponding to each of the pixels;

buffering the converted black and white display data into a queue, extracting the black and white display data from the queue by using a preset real-time process and outputting to a data interface of the black and white screen according to a preset frame rate; and displaying the black and white display data that are corresponding to each of the pixels on the black and white screen.

Optionally, the acquiring Android display data that are generated in the Android platform comprises:

monitoring the transferring status of the Android display data in the Android platform, and before the Android display data are transferred to a color display screen driver that does not match with the black and white screen, intercepting the Android display data, and prohibiting the Android display data to be inputted to the color display screen driver.

Optionally, the method further comprises:

according to processes that run in the Android platform and running statuses of each of the processes, setting a priority level of the real-time process; and monitoring the state of the queue, and when it is monitored that black and white display data are placed into the queue, starting up the real-time process by using a waking-up mechanism of the Android platform, so that the real-time process extracts the black and white display data from the queue.

Optionally, the Android display data that are corresponding to each of the pixels comprise: RGB data of multiple data bits; and the black and white display data that are corresponding to each of the pixels comprise: black and white two-value data of single data bit; and the converting the Android display data that are corresponding to each of pixels into black and white display data that are corresponding to each of the pixels comprises:

obtaining an initial gray scale value that is corresponding to the RGB data by calculating the RGB data by the following formula:

initial gray scale value=$R \times 313524 + G \times 615514 + B \times 119538$; and shifting the calculated initial gray scale value to the right by 20 bits to obtain a grey scale value that is corresponding to the RGB data, and converting the grey scale value into the black and white two-value data.

Optionally, the displaying the black and white display data that are corresponding to each of the pixels on the black and white screen comprises:

transferring the black and white display data that are corresponding to each of the pixels to a black and white display screen driver that is corresponding to a serial peripheral interface that acts as a data interface of the black and white screen, and transferring the black and white display data that are corresponding to each of the pixels by the serial peripheral interface to the black and white screen, to be displayed by the black and white screen.

According to another aspect of the present disclosure, there is provided a device for a black and white screen display based on an Android platform, the device comprising:

an initializing unit, for selecting a size of the black and white screen according to an image display size that is generated in the Android platform, so that the image display size is adapted to the size of the black and white screen;

a data converting unit, for acquiring Android display data that are generated in the Android platform, and prohibiting the Android display data to be directly outputted to the black and white screen; and individually converting the Android display data that are corresponding to each of pixels into black and white display data that are corresponding to each of the pixels; and a display processing unit, for buffering the converted black and white display data into a queue, extracting the black and white display data from the queue by using a preset real-time process and outputting to a data interface of the black and white screen according to a preset frame rate; and displaying the black and white display data that are corresponding to each of the pixels to the black and white screen.

Optionally, the data converting unit is for monitoring the transferring status of the Android display data in the Android platform, and before the Android display data are transferred to a color display screen driver that does not match with the black and white screen, intercepting the Android display data, and prohibiting the Android display data to be inputted to the color display screen driver.

Optionally, the display processing unit is further for according to processes that run in the Android platform and running statuses of each of the processes, setting a priority level of the real-time process; and, monitoring the state of the queue, and when it is monitored that black and white display data are placed into the queue, starting up the real-time process by using a waking-up mechanism of the Android platform, so that the real-time process extracts the black and white display data from the queue.

Optionally, the Android display data that are corresponding to each of the pixels comprise: RGB data of multiple data bits; and the black and white display data that are corresponding to each of the pixels comprise: black and white two-value data of single data bit; and the data converting unit is for obtaining an initial gray scale value that is corresponding to the RGB data by calculating the RGB data by the following formula:

initial gray scale value=$R \times 313524 + G \times 615514 + B \times 119538$; and shifting the calculated initial gray scale value to the right by 20 bits to obtain a grey scale value that is corresponding to the RGB data, and converting the grey scale value into the black and white two-value data.

Optionally, the display processing unit is for transferring the black and white display data that are corresponding to each of the pixels to a black and white display screen driver that is corresponding to a serial peripheral interface that acts as a data interface of the black and white screen, and transferring the black and white display data that are corresponding to each of the pixels by the serial peripheral interface to the black and white screen, to be displayed by the black and white screen.

According to another aspect of the present disclosure, there is provided a smart terminal, the smart terminal is provided with a black and white screen, and the smart terminal comprises any one of the abovementioned device for a black and white screen display based on an Android platform, wherein the smart terminal is provided with a mounting part, and is connected to a main body equipment by the mounting part.

It can be known from the above that, the technical solutions provided by the present disclosure intercept Android display data that are generated in the Android platform, convert the Android display data that are generated in the Android platform into black and white display data that are suitable to be displayed on the black and white screen, buffer the black and white display data into a queue, extract the black and white display data from the queue according to a preset frame rate and output to a data interface of the black and white screen, which avoids the frame drop phenomenon that is caused by the discrepancy between the generation rate of the black and white display data and the data transmission rate of the data interface of the black and white screen, realizes the smooth display of the images that are generated in the Android platform on the black and white screen, and meets the demands on black and white display in the Android platform under specific situations.

DETAILED DESCRIPTION

Figure 1:
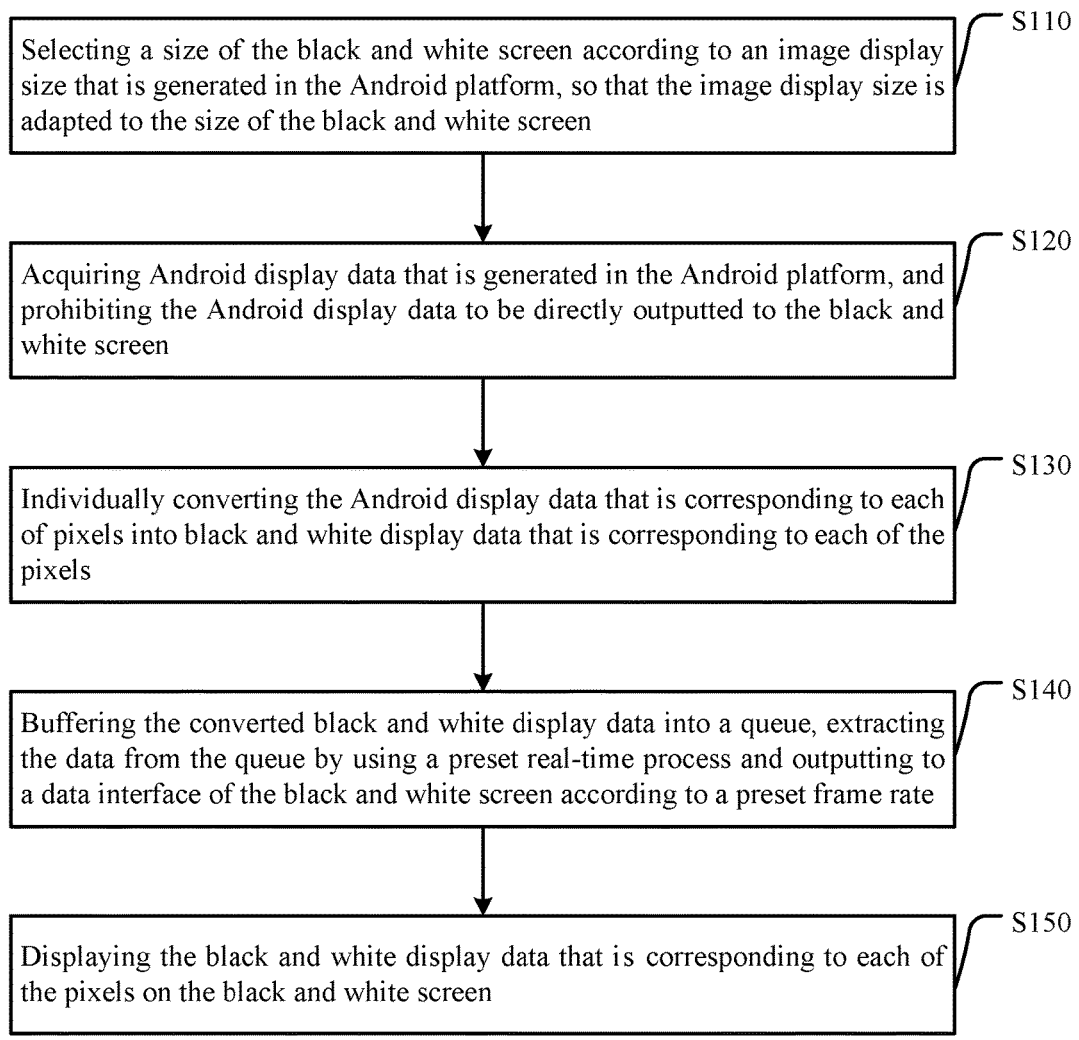
FIG. 1 shows the flow chart of the method for a black and white screen display based on an Android platform according to an embodiment of the present disclosure.

In order to make the objects, technical solutions and advantages of the present disclosure clearer, the embodiments of the present disclosure will be further described in detail below by referring to the drawings.

FIG. 1 shows the flow chart of the method for a black and white screen display based on an Android platform according to an embodiment of the present disclosure. As shown in FIG. 1 the method comprises:

Step S110, selecting a size of the black and white screen according to an image display size that is generated in the Android platform, so that the image display size is adapted to the size of the black and white screen;

wherein, the image that is generated in the Android platform comprises: the images that are generated by original Android applications in the Android platform and the images that are generated by third-party Android applications in the Android platform;

Step S120, acquiring Android display data that are generated in the Android platform, and prohibiting the Android display data to be directly outputted to the black and white screen;

Step S130, individually converting the Android display data that are corresponding to each of pixels into black and white display data that are corresponding to each of the pixels;

Step S140, buffering the converted black and white display data into a queue, extracting the black and white display data from the queue by using a preset real-time process and outputting the converted black and white display data to a data interface of the black and white screen according to a preset frame rate; and Step S150, displaying the black and white display data that are corresponding to each of the pixels on the black and white screen.

It can be seen that, the method shown in FIG. 1 intercepts Android display data that are generated in the Android platform, converts the Android display data that are generated in the Android platform into black and white display data that are suitable to be displayed on the black and white screen, buffers the black and white display data into a queue, extracts the black and white display data from the queue according to a preset frame rate and output the black and white display data to a data interface of the black and white screen, which avoids the frame drop phenomenon that is caused by the discrepancy between the generation rate of the black and white display data and the data transmission rate of the data interface of the black and white screen, realizes the smooth display of the images that are generated in the Android platform on the black and white screen, and meets the demand on black and white display in the Android platform under specific situations.

According to the conventional display mechanism of the Android platform, when the Android applications of different types in the Android platform are to display corresponding images, they need to transfer the source data by different software Layers to the SurfaceFlinger Service in the Android platform to compose, converting the source data into Android display data; then transfer the Android display data by the FrameBuffer Driver to the Android Display Driver; and write the Android display data by the Android Display Driver into a color display screen driver (color LCD driver) (for example, a display screen driver that is adapted to the MIPI interface, the TTL interface, the LVDS interface or the EDP interface) that is corresponding to a color screen that is default in the Android platform, so that the Android display data are transferred by the data interface that is corresponding to the color LCD driver to the corresponding screen to be displayed.

Based on the above data transmission flow, in an embodiment of the present disclosure, the acquiring Android display data that are generated in the Android platform in Step S120 of the method shown in FIG. 1 comprises: monitoring the transferring status of the Android display data in the Android platform, and before the Android display driver writes the Android display data into a color display screen driver (color LCD driver) that does not match with the black and white screen, intercepting the Android display data, and prohibiting the Android display data to be inputted to the color display screen driver (color LCD driver) that does not match with the black and white screen.

Figure 2:
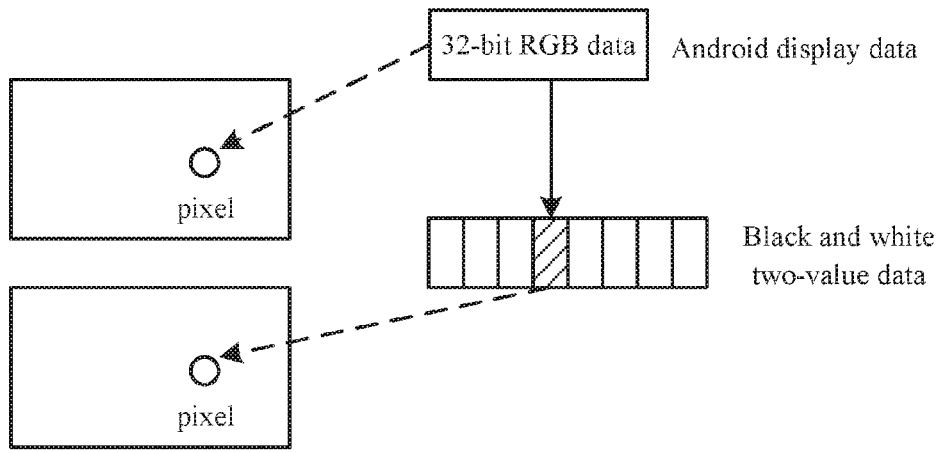
FIG. 2 shows the schematic diagram of the converting of the Android display data according to an embodiment of the present disclosure.

After acquiring the Android display data, perform a conversion operation on them. In an embodiment of the present disclosure, the Android display data that are corresponding to each of the pixels comprise: RGB data of multiple data bits; and the black and white display data that are corresponding to each of the pixels comprise: black and white two-value data of single data bit. Then, Step S130 comprises: converting RGB data of multiple data bits into black and white two-value data of single data bit. For example, FIG. 2 shows the schematic diagram of converting the Android display data. As shown in FIG. 2, the Android display data that are corresponding to each of the pixels are 32-bit RGB data, and the embodiment converts the 32-bit data into 1 bit black and white two-value data, to satisfy the display demand of the black and white screen.

Specifically, the data converting process is: firstly converting the RGB data into a corresponding grey scale value, then converting the grey scale value into the black and white two-value data. Specifically, the data converting process is obtaining an initial gray scale value that is corresponding to the RGB data by calculating the RGB data by the following formula:

initial gray scale value=$R \times 313524 + G \times 615514 + B \times 119538$; and shifting the calculated initial gray scale value to the right by 20 bits to obtain a grey scale value that is corresponding to the RGB data. Compared with the mode of obtaining a grey scale value that is corresponding to RGB data by calculating by the formula $R \times 0.299 + G \times 0.587 + B \times 0.114$ of the prior art, the data converting process of the present embodiment, by using integer multiplication and shift operation, avoids the floating-point operation and the dividing operation which have slow speeds, and largely increases the operation efficiency, and then by comparing the grey scale value and a preset threshold, converts the grey scale value corresponding to each of the pixels into black value data or white value data, for example as represented by 1 or 0. Further, regarding the data that have been converted, when that each of the pixels corresponds to multiple bit data is converted into that each of the pixels correspond to 1 bit data, it is required to reorganize the data that have been converted, to organize the data that have been converted that are corresponding to each of the pixels according to bit numbering, so that the data that have been converted that are corresponding to each of the pixels are located in lower addresses of the memory, and this manner of organization is adapted to the data format that has been converted and facilitates reading and using.

In the method shown in FIG. 1, Step S140 extracts the data from the queue by using a preset real-time process and outputs the data to a data interface of the black and white screen according to a preset frame rate; wherein, if the priority level of the real-time process is too high, the process occupies the resources of the Android platform for a long time, which causes the collapsing of the platform, and if the priority level of the real-time process is too low, the instantaneity of the transmitting of the black and white display data cannot be ensured. Therefore, in an embodiment of the present disclosure, it is required to, according to processes that run in the Android platform and running statuses of each of the processes, adjust a priority level of the real-time process. Specifically, the embodiment can in advance evaluate the number, the running statuses and the priority levels of all the processes that run in the overall system, and set the priority level of the real-time process to be one below the priority level of the most important process in the Android platform (for example the event monitoring progress), to avoid affecting the running of the Android platform while ensuring effectively scheduling the real-time process to the greatest extent.

Further, the method shown in FIG. 1 further comprises: monitoring the state of the queue, and when it is monitored that black and white display data are placed into the queue, starting up the real-time process by using a waking-up mechanism of the Android platform, so that the real-time process extracts the black and white display data from the queue.

Because the black and white screens generally only support the data transmission of the SPI interface, in an embodiment of the present disclosure, the displaying the black and white display data that are corresponding to each of the pixels on the black and white screen in Step S150 of the method shown in FIG. 1 comprises: transferring the black and white display data that are corresponding to each of the pixels to a black and white display screen driver (black and white LCD driver) that is corresponding to a serial peripheral interface (SPI interface) that acts as a data interface of the black and white screen, and transferring the black and white display data that are corresponding to each of the pixels by the serial peripheral interface to the black and white screen, so that the black and white display data can be displayed by the black and white screen.

Figure 3:
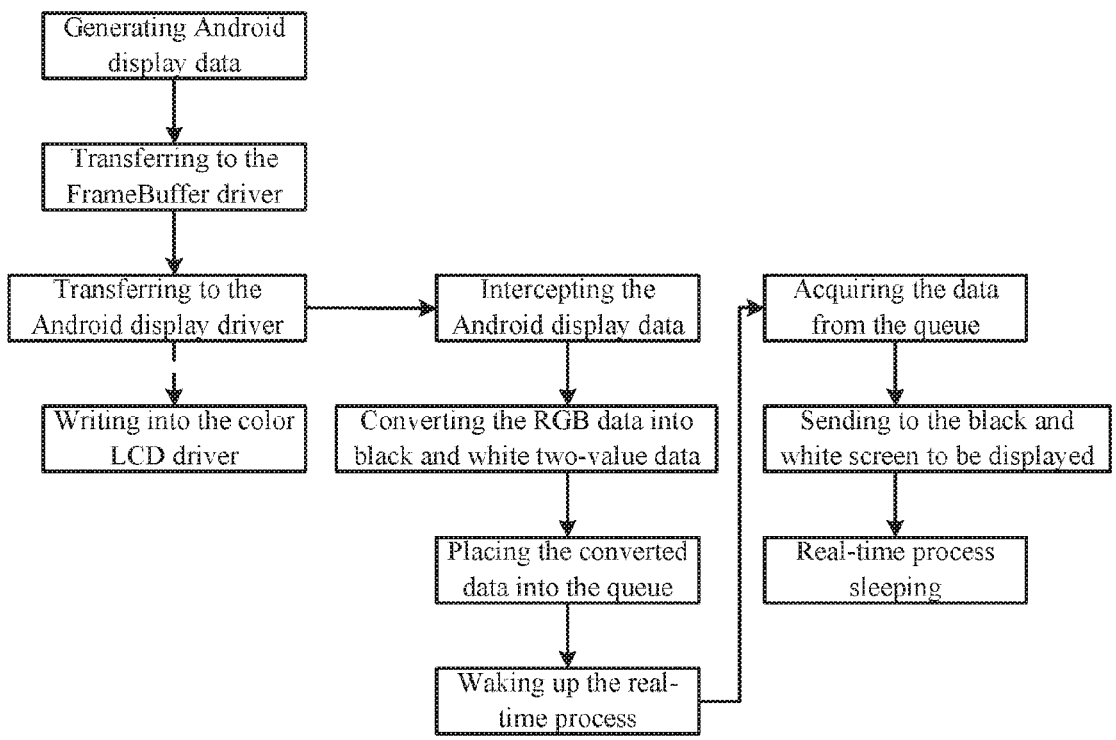
FIG. 3 shows the flow chart of the display mechanism of an Android platform according to an embodiment of the present disclosure.

In order to further describe the difference between the technical solution of the present disclosure and that of the prior art, FIG. 3 shows the flow chart of the display mechanism of the Android platform, including the conventional display mechanism of the Android platform and the display mechanism of the Android platform of the present disclosure, to describe the influence and change of the implementing of the present disclosure on the conventional display mechanism of the Android platform. As shown in FIG. 3, the Android platform generates Android display data, the Android display data are transferred to the Android Display Driver via the FrameBuffer Driver, and according to the conventional display mechanism of the Android platform, the Android Display Driver will write the received Android display data into a color LCD driver (for example, a display screen driver that is adapted to the MIPI interface, the TTL interface, the LVDS interface or the EDP interface) that is default in the Android platform. However, in the embodiments of the present disclosure, before the Android Display Driver writes the Android display data into the color LCD driver, the embodiment intercepts the Android display data, converts the Android display data (RGB data of multiple data bits) into black and white two-value data, and places the black and white two-value data that have been converted into the queue; every time black and white two-value data are placed into the queue, the real-time process is woken up by the waking-up mechanism of the Android platform, and the real-time process acquires the black and white two-value data from the queue, and sends the black and white two-value data via the SPI interface to the black and white screen to be displayed, and when no black and white two-value data are placed into the queue, the real-time process returns to the sleeping state, and waits to be woken up next time.

Figure 4:
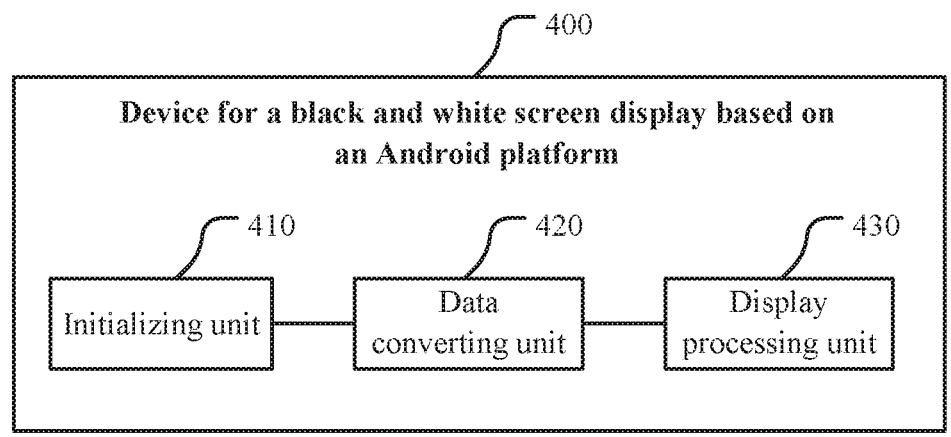
FIG. 4 shows the schematic diagram of the device for a black and white screen display based on an Android platform according to an embodiment of the present disclosure.

FIG. 4 shows the schematic diagram of the device for a black and white screen display based on an Android platform according to an embodiment of the present disclosure. As shown in FIG. 4, the device 400 for a black and white screen display comprises:

an initializing unit 410, for selecting a size of the black and white screen according to an image display size that is generated in the Android platform, so that the image display size is adapted to the size of the black and white screen;

a data converting unit 420, for acquiring Android display data that are generated in the Android platform, and prohibiting the Android display data to be directly outputted to the black and white screen; and individually converting the Android display data that are corresponding to each of pixels into black and white display data that are corresponding to each of the pixels; and a display processing unit 430, for buffering the converted black and white display data a queue, extracting the black and white display data from the queue by using a preset real-time process and outputting the black and white display data to a data interface of the black and white screen according to a preset frame rate; displaying the black and white display data that are corresponding to each of the pixels on the black and white screen.

It can be seen that, the device shown in FIG. 4, by the cooperation of the units, intercepts Android display data that are generated in the Android platform, converts the Android display data that are generated in the Android platform into black and white display data that are suitable to be displayed on the black and white screen, buffers the black and white display data into a queue, extracts the black and white display data from the queue according to a preset frame rate and outputs to a data interface of the black and white screen, which avoids the frame drop phenomenon that is caused by the discrepancy between the generation rate of the black and white display data and the data transmission rate of the data interface of the black and white screen, realizes the smooth display of the images that are generated in the Android platform on the black and white screen, and meets the demand on black and white display in the Android platform under specific situations.

In an embodiment of the present disclosure, the data converting unit 420 is for monitoring the transferring status of the Android display data in the Android platform, and before the Android display data are transferred to a color display screen driver (color LCD driver) that does not match with the black and white screen, intercepting the Android display data, and prohibiting the Android display data to be inputted to the color LCD driver.

In an embodiment of the present disclosure, the display processing unit 430 is further for according to processes that run in the Android platform and running statuses of each of the processes, setting a priority level of the real-time process; and, monitoring the state of the queue, and when it is monitored that black and white display data are placed into the queue, starting up the real-time process by using a waking-up mechanism of the Android platform, so that the real-time process extracts the black and white display data from the queue.

In an embodiment of the present disclosure, the Android display data that are corresponding to each of the pixels comprise: RGB data of multiple data bits; and the black and white display data that are corresponding to each of the pixels comprise: black and white two-value data of single data bit; and the data converting unit is for obtaining an initial gray scale value that is corresponding to the RGB data by calculating the RGB data by the following formula:

initial gray scale value=$(R \times 313524 + G \times 615514 + B \times 119538)$; and shifting the calculated initial gray scale value to the right by 20 bits to obtain a grey scale value that is corresponding to the RGB data, and converting the grey scale value into the black and white two-value data.

In an embodiment of the present disclosure, the display processing unit 430 is for transferring the black and white display data that are corresponding to each of the pixels to a black and white display screen driver (black and white LCD driver) that is corresponding to a SPI interface that acts as a data interface of the black and white screen, and transferring the black and white display data that are corresponding to each of the pixels by the SPI interface to the black and white screen, so that the black and white display data can be displayed by the black and white screen.

It should be noted that, the embodiments of the device shown in FIG. 4 are the same as the corresponding embodiments of the method shown in FIG. 1, which are in detailed described above, and will not be in detail described here.

Figure 5:
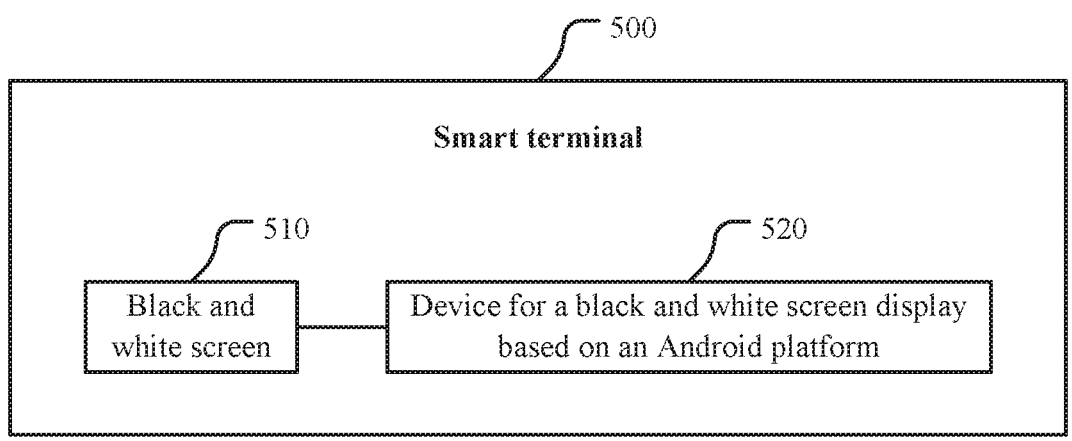
FIG. 5 shows the schematic diagram of a smart terminal according to an embodiment of the present disclosure.

FIG. 5 shows the schematic diagram of a smart terminal according to an embodiment of the present disclosure. As shown in FIG. 5, the smart terminal 500 is provided with a black and white screen 510, and the smart terminal 500 comprises the device 520 for a black and white screen display based on an Android platform, wherein the smart terminal 500 is further provided with a mounting part, and is connected to a main body equipment by the mounting part, to provide data display to the main body equipment.

In that, the smart terminal 500 is provided with the Android platform, the smart terminal 500 further comprises an Android Display Driver and a color LCD driver, the size of the black and white screen 510 is adapted to the image display size that is generated in the Android platform, and the Android platform generates and transfers Android display data to the Android Display Driver. The device 520 for a black and white screen display based on an Android platform, before the Android Display Driver writes the Android display data into the color LCD driver, intercepts the Android display data, converts the Android display data into black and white display data and places the data into the queue, acquires the black and white display data from the queue by using the real-time process and sends the data to the black and white screen 510 to be displayed.

Based on the advantage of the black and white screen 510 of having a good visibility in the sun, the embodiment applies the smart terminal 500 on outdoor equipments, and with the outdoor equipments as the main body equipment, provides clearer data display to the main body equipment by the smart terminal 500. For example, the smart terminal 500 is mounted as a navigation equipment on a handle bar of a mountain bicycle that is as the main body equipment, so that the user can clearly see the navigation information that is displayed on the smart terminal 500 at any moment during outdoor bicycling, which meets the user demand.

In conclusion, the technical solutions provided by the present disclosure modify the conventional Android display mechanism, and before the Android display data are transferred to a display screen driver that does not match with the black and white screen, acquire Android display data that are generated in the Android platform; by using the modified grey scale value calculating formula, convert the Android display data into black and white display data that are suitable to be displayed on the black and white screen, and buffer the black and white display data into a queue; and set a real-time process having a reasonable priority level, start up at the proper time the real-time process by the waking-up mechanism of the Android platform, by using the real-time process according to a preset frame rate extract the data from the queue and output to a data interface of the black and white screen, which avoids the frame drop phenomenon that is caused by the discrepancy between the generation rate of the black and white display data and the data transmission rate of the data interface of the black and white screen. The whole procedure ensures the reasonable scheduling and using of the resources in the Android platform, realizes the smooth display of the images that are generated in the Android platform on the black and white screen, and meets the demand on black and white display in the Android platform under specific situations.

The above descriptions are merely preferable embodiments of the present disclosure, and are not limiting the protection scope of the present disclosure. Any modifications, equivalent substitutions or improvements that are made within the spirit and principle of the present disclosure are all included in the protection scope of the present disclosure.

The invention claimed is:

1. A method for a black and white screen display based on an Android platform, wherein the method comprises:
   selecting a size of the black and white screen according to an image display size that is generated in the Android platform, so that the image display size is adapted to the size of the black and white screen;
   acquiring Android display data that is generated in the Android platform, and prohibiting the Android display data to be directly outputted to the black and white screen;
   individually converting the Android display data that is corresponding to each of pixels into black and white display data that is corresponding to each of the pixels;
   buffering the converted black and white display data into a queue, extracting the black and white display data from the queue by using a preset real-time process and outputting to a data interface of the black and white screen according to a preset frame rate; and
   displaying the black and white display data that is corresponding to each of the pixels on the black and white screen.

2. The method according to claim 1, wherein acquiring Android display data that is generated in the Android platform comprises:
   monitoring the transferring status of the Android display data in the Android platform, and before the Android display data is transferred to a color display screen driver that does not match with the black and white screen, intercepting the Android display data, and prohibiting the Android display data to be inputted to the color display screen driver that does not match with the black and white screen.

3. The method according to claim 1, wherein the method further comprises:
   according to processes that run in the Android platform and running statuses of each of the processes, setting a priority level of the real-time process; and
   monitoring the state of the queue, and when it is monitored that black and white display data is placed into the queue, starting up the real-time process by using a waking-up mechanism of the Android platform, so that the real-time process extracts the black and white display data from the queue.

4. The method according to claim 1, wherein the Android display data that is corresponding to each of the pixels comprise: RGB data of multiple data bits; and the black and white display data that is corresponding to each of the pixels comprise: black and white two-value data of single data bit; and
   converting the Android display data that is corresponding to each of pixels into black and white display data that is corresponding to each of the pixels comprises:
   obtaining an initial gray scale value that is corresponding to the RGB data by calculating the RGB data by the following formula:

initial gray scale value=$R \times 313524 + G \times 615514 + B \times 119538$; and shifting the calculated initial gray scale value to the right by 20 bits to obtain a grey scale value that is corresponding to the RGB data, and converting the grey scale value into the black and white two-value data.

5. The method according to claim 1, wherein displaying the black and white display data that is corresponding to each of the pixels on the black and white screen comprises:
   transferring the black and white display data that is corresponding to each of the pixels to a black and white display screen driver that is corresponding to a serial peripheral interface that acts as a data interface of the black and white screen, and transferring the black and white display data that is corresponding to each of the pixels by the serial peripheral interface to the black and white screen, to be displayed by the black and white screen.

6. A device for a black and white screen display based on an Android platform, wherein the device comprises:
   an initializing unit, for selecting a size of the black and white screen according to an image display size that is generated in the Android platform, so that the image display size is adapted to the size of the black and white screen;
a data converting unit, for acquiring Android display data that is generated in the Android platform, and prohibiting the Android display data to be directly outputted to the black and white screen; and individually converting the Android display data that is corresponding to each of pixels into black and white display data that is corresponding to each of the pixels; and
a display processing unit, for buffering the converted black and white display data into a queue, extracting the black and white display data from the queue by using a preset real-time process and outputting to a data interface of the black and white screen according to a preset frame rate; and displaying the black and white display data that is corresponding to each of the pixels on the black and white screen.

7. The device according to claim 6, wherein
the data converting unit is for monitoring the transferring status of the Android display data in the Android platform, and before the Android display data is transferred to a color display screen driver that does not match with the black and white screen, intercepting the Android display data, and prohibiting the Android display data to be inputted to the color display screen driver that does not match with the black and white screen.

8. The device according to claim 6, wherein,
the display processing unit is further for according to processes that run in the Android platform and running statuses of each of the processes, setting a priority level of the real-time process; and, monitoring the state of the queue, and when it is monitored that black and white display data is placed into the queue, starting up the real-time process by using a waking-up mechanism of the Android platform, so that the real-time process extracts the black and white display data from the queue.

9. The device according to claim 6, wherein the Android display data that is corresponding to each of the pixels comprise: RGB data of multiple data bits; and the black and white display data that is corresponding to each of the pixels comprise: black and white two-value data of single data bit; and
the data converting unit is for obtaining an initial gray scale value that is corresponding to the RGB data by calculating the RGB data by the following formula: initial gray scale value=R×313524+G×615514+B×119538; and shifting the calculated initial gray scale value to the right by 20 bits to obtain a grey scale value that is corresponding to the RGB data, and converting the grey scale value into the black and white two-value data.

10. The device according to claim 6, wherein
the display processing unit is for transferring the black and white display data that is corresponding to each of the pixels to a black and white display screen driver that is corresponding to a serial peripheral interface that acts as a data interface of the black and white screen, and transferring the black and white display data that is corresponding to each of the pixels by the serial peripheral interface to the black and white screen, to be displayed by the black and white screen.

11. A smart terminal, wherein the smart terminal is provided with a black and white screen, and the smart terminal comprises a device for a black and white screen display based on an Android platform, wherein the smart terminal is provided with a mounting part, and is connected to a main body equipment by the mounting part;
wherein the device for a black and white screen display based on an Android platform comprises:
an initializing unit, for selecting a size of the black and white screen according to an image display size that is generated in the Android platform, so that the image display size is adapted to the size of the black and white screen;
a data converting unit, for acquiring Android display data that is generated in the Android platform, and prohibiting the Android display data to be directly outputted to the black and white screen; and individually converting the Android display data that is corresponding to each of pixels into black and white display data that is corresponding to each of the pixels; and
a display processing unit, for buffering the converted black and white display data into a queue, extracting the black and white display data from the queue by using a preset real-time process and outputting to a data interface of the black and white screen according to a preset frame rate; and displaying the black and white display data that is corresponding to each of the pixels on the black and white screen.

12. The smart terminal according to claim 11, wherein
the data converting unit is for monitoring the transferring status of the Android display data in the Android platform, and before the Android display data is transferred to a color display screen driver that does not match with the black and white screen, intercepting the Android display data, and prohibiting the Android display data to be inputted to the color display screen driver that does not match with the black and white screen.

13. The smart terminal according to claim 11, wherein
the display processing unit is further for according to processes that run in the Android platform and running statuses of each of the processes, setting a priority level of the real-time process; and, monitoring the state of the queue, and when it is monitored that black and white display data is placed into the queue, starting up the real-time process by using a waking-up mechanism of the Android platform, so that the real-time process extracts the black and white display data from the queue.

14. The smart terminal according to claim 11, wherein the Android display data that is corresponding to each of the pixels comprise: RGB data of multiple data bits; and the black and white display data that is corresponding to each of the pixels comprise: black and white two-value data of single data bit; and
the data converting unit is for obtaining an initial gray scale value that is corresponding to the RGB data by calculating the RGB data by the following formula: initial gray scale value=R×313524+G×615514+B×119538; and shifting the calculated initial gray scale value to the right by 20 bits to obtain a grey scale value that is corresponding to the RGB data, and converting the grey scale value into the black and white two-value data.

15. The smart terminal according to claim 11, wherein
the display processing unit is for transferring the black and white display data that is corresponding to each of the pixels to a black and white display screen driver that is corresponding to a serial peripheral interface that acts as a data interface of the black and white screen, and transferring the black and white display data that is corresponding to each of the pixels by the serial peripheral interface to the black and white screen, to be displayed by the black and white screen.

* * * * *